(12) United States Patent
Petersen

(10) Patent No.: US 11,929,672 B2
(45) Date of Patent: Mar. 12, 2024

(54) INVERTING BUCK-BOOST CONVERTER

(71) Applicant: Dialog Semiconductor (UK) Limited, London (GB)

(72) Inventor: Holger Petersen, Pastetten (DE)

(73) Assignee: Renesas Design (UK) Limited, Bourne End (GB)

( * ) Notice: Subject to any disclaimer, the term of this patent is extended or adjusted under 35 U.S.C. 154(b) by 371 days.

(21) Appl. No.: 17/396,594

(22) Filed: Aug. 6, 2021

(65) Prior Publication Data
US 2023/0037874 A1    Feb. 9, 2023

(51) Int. Cl.
H02M 3/00    (2006.01)
H02M 1/00    (2006.01)
H02M 3/07    (2006.01)

(52) U.S. Cl.
CPC ........... H02M 3/07 (2013.01); H02M 1/0095 (2021.05)

(58) Field of Classification Search
CPC ....... H02M 3/07; H02M 1/0095; H02M 3/158
See application file for complete search history.

(56) References Cited

U.S. PATENT DOCUMENTS

| | | |
|---|---|---|
| 6,963,497 B1 | 11/2005 | Herbert |
| 7,230,405 B2 | 6/2007 | Jang et al. |
| 7,782,027 B2 | 8/2010 | Williams |
| 8,427,113 B2 | 4/2013 | Xing et al. |
| 9,559,589 B2 | 1/2017 | Petersen |
| 9,768,682 B2 | 9/2017 | Banag |
| 10,218,255 B1 | 2/2019 | Petersen |
| 10,256,729 B1 | 4/2019 | Notsch |
| 10,291,117 B2 | 5/2019 | Petersen |
| 10,298,124 B2 | 5/2019 | Petersen et al. |
| 10,476,390 B2 | 11/2019 | Petersen |
| 10,756,623 B1 | 8/2020 | Petersen |
| 10,790,742 B1 | 9/2020 | Petersen |
| 10,811,974 B1 | 10/2020 | Petersen |
| 11,709,515 B1 * | 7/2023 | Asano ..................... G05F 1/563 323/273 |

(Continued)

OTHER PUBLICATIONS

U.S. Office Action, U.S. Appl. No. 17/396,591, Applicant: Holger Petersen, dated Nov. 17, 2022, 25 pages.

(Continued)

*Primary Examiner* — Jue Zhang
*Assistant Examiner* — Afework S Demisse
(74) *Attorney, Agent, or Firm* — Saile Ackerman LLC; Stephen B. Ackerman

(57) ABSTRACT

A power converter and a corresponding method of converting power are presented. The power converter includes a ground port, an input port for receiving an input voltage and an output port for providing an output voltage; an inductor; a flying capacitor; a network of switches; and a driver to drive the network of switches with a sequence of states during a drive period. The sequence of states includes a first state and a second state. In the first state one of the input port and the output port is coupled to the ground port via a first path comprising the inductor. In the second state the remaining state among the input port and the output port is coupled to the ground port via a second path and a third path, the second path comprising the flying capacitor and bypassing the inductor, and the third path comprising the inductor.

18 Claims, 16 Drawing Sheets

(56) References Cited

U.S. PATENT DOCUMENTS

| | | |
|---|---|---|
| 2008/0079393 A1 | 4/2008 | Spartano et al. |
| 2008/0157732 A1 | 7/2008 | Williams |
| 2008/0158915 A1 | 7/2008 | Williams |
| 2009/0033289 A1 | 2/2009 | Xing et al. |
| 2009/0174466 A1 | 7/2009 | Hsieh et al. |
| 2010/0188065 A1 | 7/2010 | Shiwaya |
| 2011/0062940 A1 | 3/2011 | Shavartsman |
| 2013/0147543 A1 | 6/2013 | Dai et al. |
| 2014/0070787 A1 | 3/2014 | Arno |
| 2015/0061613 A1 | 3/2015 | Kondou |
| 2015/0280553 A1 | 10/2015 | Giuliano et al. |
| 2015/0311793 A1 | 10/2015 | Khayat et al. |
| 2016/0344214 A1 | 11/2016 | Petersen et al. |
| 2017/0163157 A1 | 6/2017 | Petersen |
| 2017/0244318 A1 | 8/2017 | Giuliano |
| 2017/0302093 A1 | 10/2017 | Petersen |
| 2019/0341850 A1 | 11/2019 | Macri |
| 2022/0181973 A1 | 6/2022 | Huang et al. |
| 2022/0190724 A1* | 6/2022 | Petersen ............ H02M 3/01 |
| 2022/0311339 A1 | 9/2022 | Yen et al. |

OTHER PUBLICATIONS

"A Hybrid Dual-Path Step-Down Converter with 96.2% Peak Efficiency using a 250mΩ Large-DCR Inductor," by Yeunhee Huh et al., 2018 IEEE Symposium on VLSI Circuits Digest of Technical Papers, Jun. 18-22, 2018, pp. 225-226.

"A Hybrid Structure Dual-Path Step-Down Converter With 96.2% Peak Efficiency Using 250-mΩ Large-DCR Inductor," by Yeunhee Huh et al., IEEE Journal of Solid-State Circuits, vol. 54, No. 4, Apr. 2019, pp. 959-967.

"High-Efficiency Hybrid Dual-Path Step-Up DC-DC Converter With Continuous Output-Current Delivery for Low Output Voltage Ripple," by Se-Un Shin et al., IEEE Transactions on Power Electronics, vol. 35,No. 6, Jun. 2020, pp. 6025-6038.

Motorola Semiconductor Application Note: "A Unique Converter Configuration," Provides Step-Up/Down Functions, AN954, Copyright: Motorola Inc., 1985, 4 pages.

ISSCC 2017, Session 10, DC-DC Converters, 10.4, "A Hybrid Inductor-Based Flying-Capacitor-Assisted Step-Up/Step-Down DC-DC Converter with 96.56% Efficiency," by Yong-Min Ju et al., 2017 IEEE International Solid-State Circuits Conference (ISSCC), Feb. 5-9, 2017, 3 pages.

"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.

"Multi-Level Conversion: High Voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.

"A Hybrid Switched-Capacitor/Inductor Converter for Small Conversion Ratios," by Norah Elena Nakibuuka, Thesis: M. Eng., MIT, Department of Electrical Engineering and Computer Science, 2013, Copyright: Massachusetts Institute of Technology, May 2013, 69 pages.

"Analysis of Double Step-Down Two-Phase Buck Converter for VRM," by K. Nishijima et al., INTELEC 05—Twenty-Seventh International Telecommunications Conference, Sep. 18-22, 2005, pp. 497-502.

"Multi-Phase Buck Converters with Extended Duty Cycle," by Yungtaek Jang et al., Twenty-First Annual IEEE Applied Power Electronics Conference and Exposition, 2006. APEC '06, Mar. 19-23, 2006, pp. 38-44.

"Zero Inductor Voltage Multilevel Bus Converter," by Samuel Webb et al. 2018 IEEE Applied Power Electronics Conference and Exposition (APEC), Mar. 4-8, 2018, pp. 2175-2182.

Co-pending US Patent, "A Power Converter," Holger Petersen, U.S. Appl. No. 17/123,417, filed Dec. 16, 2020, 27 pages.

Co-pending US Patent, "A Power Converter," Holger Petersen, U.S. Appl. No. 16/900,669, filed Jun. 12, 2020, 72 pages.

Co-pending US Patent, "A Power Converter," Holger Petersen, U.S. Appl. No. 16/900,678, filed Jun. 12, 2020, 70 pages.

Co-pending US Patent, "A Multi-Stage Power Converter," Holger Petersen, U.S. Appl. No. 17/110,765, filed Dec. 3, 2020, 37 pages.

Co-pending US Patent, "Buck-Boost Converter," Holger Petersen, U.S. Appl. No. 17/396,591, filed Aug. 6, 2021, 39 pages.

"Right-Half-Plane Zero Elimination of Boost Converter Using Magnetic Coupling With Forward Energy Transfer," by Behzad Poorali et al., IEEE Transactions on Industrial Electronics, vol. 66, No. 11, Nov. 2019 pp. 8454-8462.

"Fully Integrated Buck Converter with 78% Efficiency at 365mW Output Power Enabled by Switched-Inductor-Capacitor Topology and Inductor Current Reduction Technique," by Nghia Tnag et al., ISSCC 2019, Session 8, DC-DC Converters 8.4, 2019 IEEE International Solid-State Circuits Conference, Feb. 17-21, 2019.

"A New Approach to Low Ripple-Noise Switching Converters on the Basis of Switched-Capacitor Converters," by Tohru Umeno et al., 1991., IEEE International Symposium on Circuits and Systems, Jun. 11-14, 1991, 4 pages.

"Three-Level Buck Converter for Envelope Tracking Applications," by Vahid Yousefzadeh et al., IEEE Transactions on Power Electronics, vol. 21, No. 2, Mar. 2006, pp. 549-552.

"Split-Phase Control: Achieving Complete Soft-Charging Operation of a Dickson Switched-Capacitor Converter," by Yutian Lei et al., IEEE Transactions on Power Electronics, vol. 31, No. 01, Jan. 2016, pp. 770-782.

"A Simple Hybrid 3-Level Buck-Boost DC-DC Converter with Efficient PWM Regulation Scheme," by Abdullah Abdulslam et al., 2015 IEEE International Conference on Electronics, Circuits, and Systems (ICECS), Dec. 6-9, 2015, pp. 368-371.

"A Hybrid DC-DC Converter Capable of Supplying Heavy Load in Step-Up and Step-Down Mode," by Jinwoo Jeon et al., 2021 IEEE International Symposium on Circuits and Systems (ISCAS), May 22-28, 2021, 5 pages.

* cited by examiner

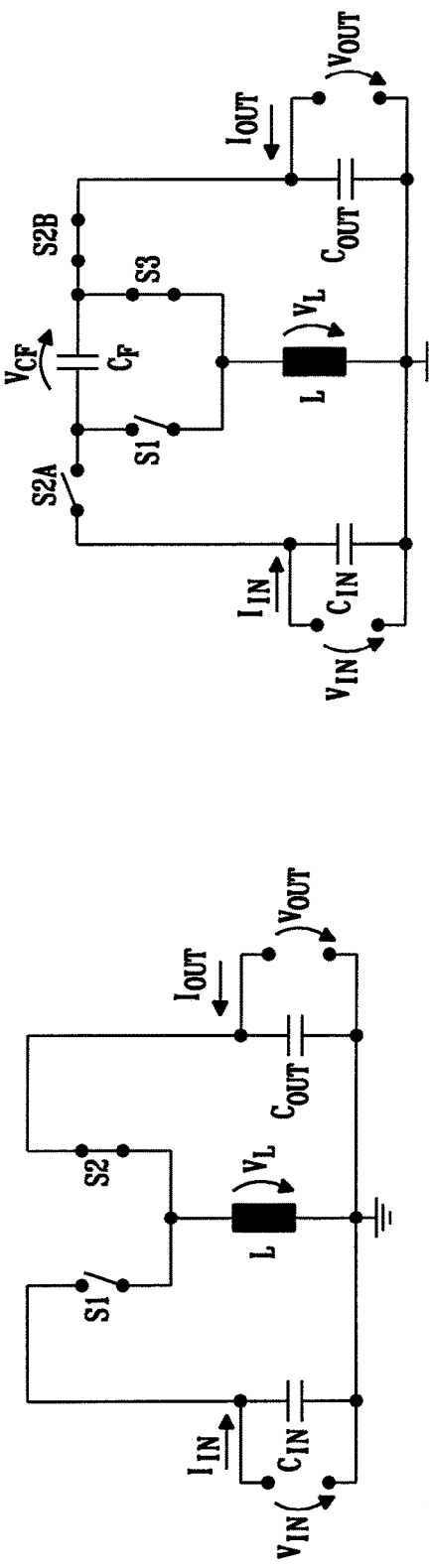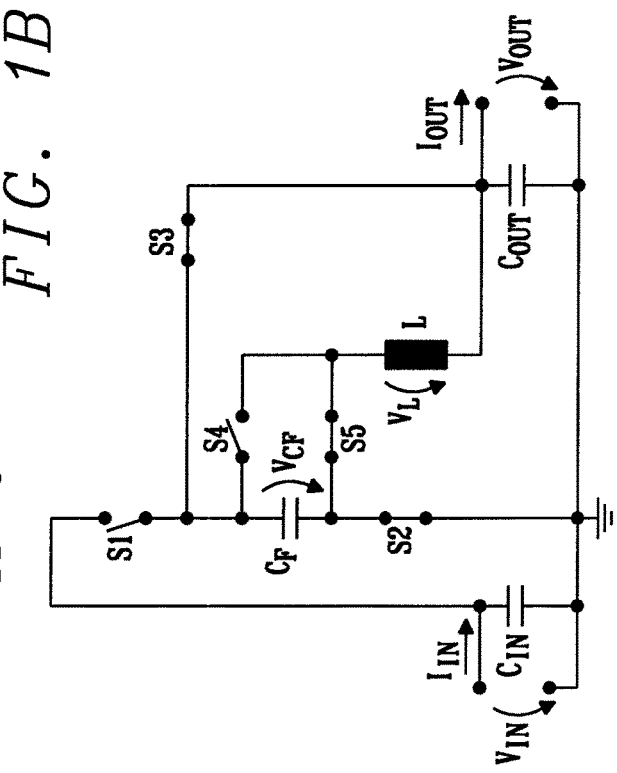
FIG. 1A Prior Art
FIG. 1B Prior Art
FIG. 1C Prior Art

INVERTING BUCK-BOOST CONVERTER

FIELD OF THE DISCLOSURE

The present disclosure relates to an inverting buck-boost converter and in particular to a hybrid inverting buck-boost converter with reduced inductor current.

BACKGROUND

Inverting buck-boost converters can be used for various applications. For instance, inverting buck-boost converters are often needed to power organic light-emitting diode (OLED) displays. An increasing number of mobile devices such as smartphones and tablet computers are adopting OLED display technology because of its superior viewing angles, contrast, and more brilliant color reproduction in comparison to LED panels using backlighting. OLED panels typically require variable negative supply voltages with an absolute value higher or lower than the output voltage of a Li-Ion battery pack. The generation of this power rails requires DC-DC buck-boost converters with inversion capabilities. Because OLED panels are sensitive to noise at the power supply rails, the corresponding converters must fulfill tight voltage accuracy specifications. As these converters operate whenever the display is active their power dissipation has a significant impact to the battery lifetime of a mobile application. Traditional pure inverting buck-boost converters suffer from large solution footprint/height (typically dominated by the inductors), average conversion efficiency and high ripple current/voltage.

SUMMARY

It is an object of the disclosure to address one or more of the above mentioned limitations.

According to a first aspect of the disclosure there is provided a power converter having a ground port, an input port for receiving an input voltage and an output port for providing an output voltage with a target conversion ratio, the power converter comprising an inductor; a flying capacitor (CF) selectively coupled to the inductor; a network of switches; and a driver adapted to drive the network of switches with a sequence of states during a drive period, the sequence of states comprising a first state and a second state, wherein in the first state one of the input port and the output port is coupled to the ground port via a first path comprising the inductor; wherein in the second state the remaining state among the input port and the output port is coupled to the ground port via a second path and a third path, the second path comprising the flying capacitor and bypassing the inductor, and the third path comprising the inductor.

Optionally, the network of switches comprises a first capacitor switch (S1) to couple a first terminal of the flying capacitor to the inductor; a second capacitor switch (S3) to couple a second terminal of the flying capacitor to the inductor; a first ground switch (S4) to couple the flying capacitor to the ground port.

Optionally, the network of switches comprises a second ground switch (S5) to couple the flying capacitor to the ground port.

Optionally, the network of switches comprises an input switch (S2A) to couple the first terminal of the flying capacitor to the input port; an output switch (S2B) to couple the second terminal of the flying capacitor to the output port.

Optionally, in the first state the first path comprises both the inductor and the flying capacitor.

Optionally, in the second state the third path comprises both the inductor and the flying capacitor.

Optionally, one of the first state and the second state is a magnetizing state and the other state is a de-magnetizing state.

Optionally, the driver is operable in at least one of a first mode and a second mode.

Optionally, in the first mode a voltage across the flying capacitor is substantial equal to minus the output voltage during the drive period and in the second mode the voltage across the flying capacitor is substantially equal to the input voltage during the drive period.

Optionally, the power converter comprises a second inductor.

Optionally, the network of switches comprises a third capacitor switch (S6) to couple a first terminal of the flying capacitor to the second inductor; a fourth capacitor switch (S7) to couple a second terminal of the flying capacitor to the second inductor.

Optionally, the network of switches comprises a first input switch (S1) to couple the first inductor to the input port, a second input switch (S5) to couple the second inductor to the input port.

Optionally, the network of switches comprises an output switch (S4) to couple the flying capacitor to the output port.

Optionally, in the first state one of the input port and the output port is coupled to the ground port via another path comprising the second inductor; and wherein in the second state the input port is coupled to the ground port via four paths that include the second path, the third path, a fourth path comprising the flying capacitor and bypassing the inductor, and a fifth path comprising the second inductor.

Optionally, the power converter is an inverting power converter to provide the output voltage with an opposite polarity compared with the input voltage.

Optionally, the power converter is operable as an inverting step-down converter or as an inverting step-up converter.

According to a second aspect of the disclosure there is provided a method of converting power with a target conversion ratio, the method comprising
 providing a power converter having a ground port, an input port for receiving an input voltage and an output port for providing an output voltage; an inductor; a flying capacitor (CF) selectively coupled to the inductor; a network of switches; and
 driving the network of switches with a sequence of states during a drive period, the sequence of states comprising a first state and a second state, wherein in the first state one of the input port and the output port is coupled to the ground port via a first path comprising the inductor; wherein in the second state the remaining state among the input port and the output port is coupled to the ground port via a second path and a third path, the second path comprising the flying capacitor and bypassing the inductor, and the third path comprising the inductor.

According to a third aspect of the disclosure there is provided a user device comprising a display and a power converter according to the first aspect of the disclosure for powering the display. For instance, the user device may be a mobile phone or a tablet.

The options described with respect to the first aspect of the disclosure are also common to the second and third aspects of the disclosure.

BRIEF DESCRIPTION OF THE DRAWINGS

The disclosure is described in further detail below by way of example and with reference to the accompanying drawings, in which:

FIG. 1A is a diagram of an inductive buck-boost converter according to the prior art;

FIG. 1B is a diagram of a hybrid inverting buck-boost according to the prior art;

FIG. 1C is a diagram of a hybrid buck converter according to the prior art;

DETAILED DESCRIPTION

FIG. 1A shows the topology of an inductive inverting buck-boost converter. In operation the coil of the inductor L is alternatively exposed to the converter input voltage $V_{IN}$ and the negative output voltage $V_{OUT}$. This typically results in high inductor current ripple and large inductor core loss.

FIG. 1B illustrates a hybrid inverting buck-boost converter according to U.S. Pat. No. 10,476,390B2. In operation, the voltage levels across the coil are reduced by the voltage $V_{CF}$ across the flying capacitor $C_F$. This voltage may for example be controlled towards $V_{CF}=(V_{IN}-V_{OUT})/2$. This reduces inductor current ripple, core loss and output voltage ripple.

FIG. 1C shows a diagram of a hybrid buck converter according to U.S. Pat. No. 10,298,124B2. The buck converter implements a reduced inductor current via a capacitive current path that bypasses the inductor (current path through switch S3).

There is a need for a converter that would combine both reduced inductor current ripple and reduced inductor current.

Figure 2:
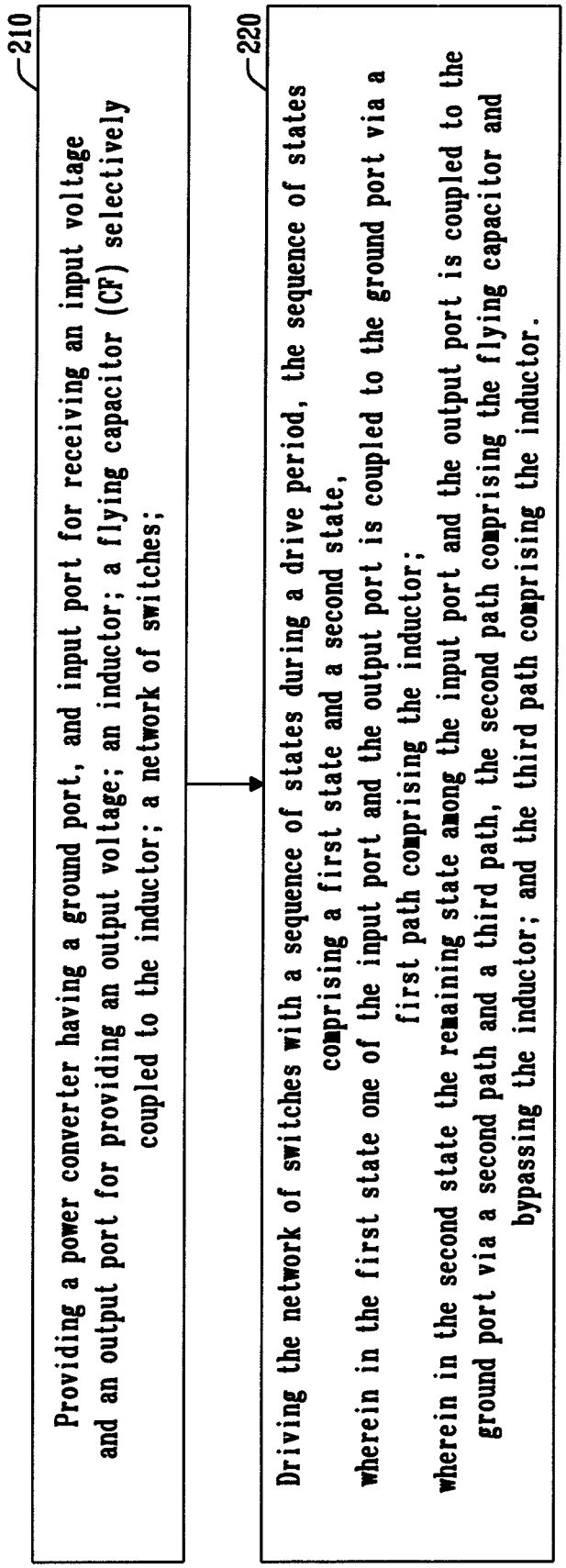
FIG. 2 is a flow chart of a method for converting power with a target conversion ratio according to the disclosure.

FIG. 2 is a flow chart of a method for converting power with a target conversion ratio according to the disclosure.

At step 210 a power converter is provided. The power converter has a ground port, an input port for receiving an input voltage, an output port for providing an output voltage, an inductor, a flying capacitor (CF) selectively coupled to the inductor and a network of switches.

At step 220 the network of switches is driven with a sequence of states during a drive period. The sequence of states comprising a first state and a second state. In the first state one of the input port and the output port is coupled to the ground port via a first path comprising the inductor. In the second state the remaining state among the input port and the output port is coupled to the ground port via a second path and a third path. The second path comprises the flying capacitor and bypasses the inductor. The third path comprises the inductor.

Figure 3:
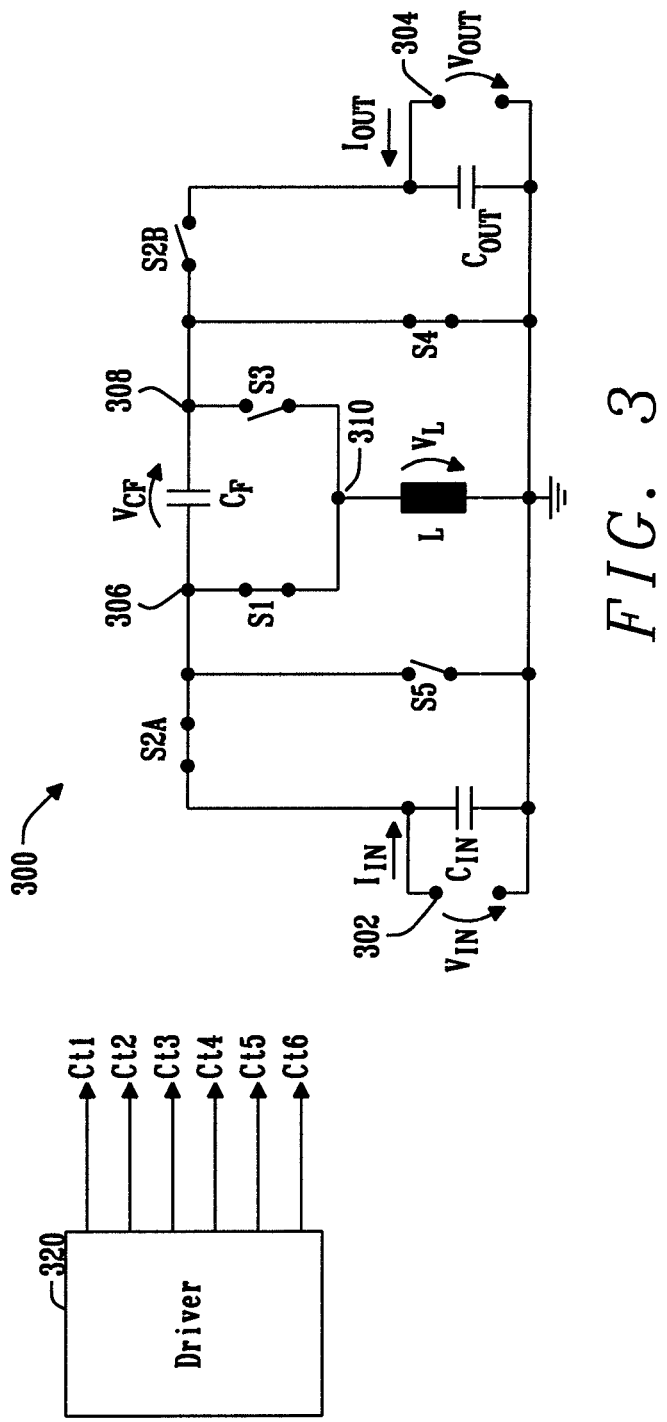
FIG. 3 is a diagram of a power converter for implementing the method of FIG. 2.

FIG. 3 shows a diagram of a power converter for implementing the method of FIG. 2. The DC-DC converter 300 includes an inductor L and a flying capacitor $C_F$ coupled between a first port (input port 302) and a second port (output port 304) by a network of switches formed of six switches S1, S2A, S2B, S3, S4, S5. An input capacitor Cin is provided between the input node 302 and ground and an output capacitor Cout is provided between the output node 304 and ground. The capacitors Cin and Cout are connected to a fixed ground voltage and may be referred to as reservoir capacitors. The capacitor $C_F$ has terminals provided with varying voltages and may be referred to as a flying capacitor.

The flying capacitor $C_F$ has a first terminal (node 306) coupled to the inductor L via the first capacitor switch S1 and a second terminal (node 308) coupled to the inductor L via the second capacitor switch S3. The inductor L has a first terminal coupled to $C_F$ at node 310 and a second terminal coupled to ground.

The flying capacitor first terminal (node 306) is coupled to the input port 302 via the input switch S2A and to ground via the first ground switch S5. The flying capacitor second terminal (node 308) is coupled to the output port 304 via the output switch S2B and to ground via the second ground switch S4.

A driver 320 is provided to generate a plurality of control signals Ct1, Ct2, Ct3, Ct4, Ct5, Ct6 to operate the switches S1, S2A, S2B, S3, S4 and S5 respectively. The driver 320 is adapted to operate the DC-DC converter 300 with a sequence of states during a drive period T. The sequence of states may include one or more magnetization states to magnetize the inductor L one or more de-magnetization states to de-magnetize the inductor L, and one or more flat states in which the inductor current remains constant. The driver may be configured to maintain the magnetization state(s) and the de-magnetization state(s) for a predetermined duration during the drive period. For instance, a duty cycle of the magnetization state(s) and a duty cycle of the de-magnetization state(s) may be selected to achieve a target conversion ratio.

The provision of the ground switches S4 and S5 permit to create current paths bypassing the inductor L (through either switch S4 or S5), hence enabling a variety of converter operations. The circuit of FIG. 3 has a simple design with only one flying capacitor and one inductor.

FIGS. 4A-4D show four different switching states that may be combined in different ways to operate the converter 300 in a first mode of operation. For instance, the first mode may be a mode of operation used to limit an average inductor current.

Figure 4A:
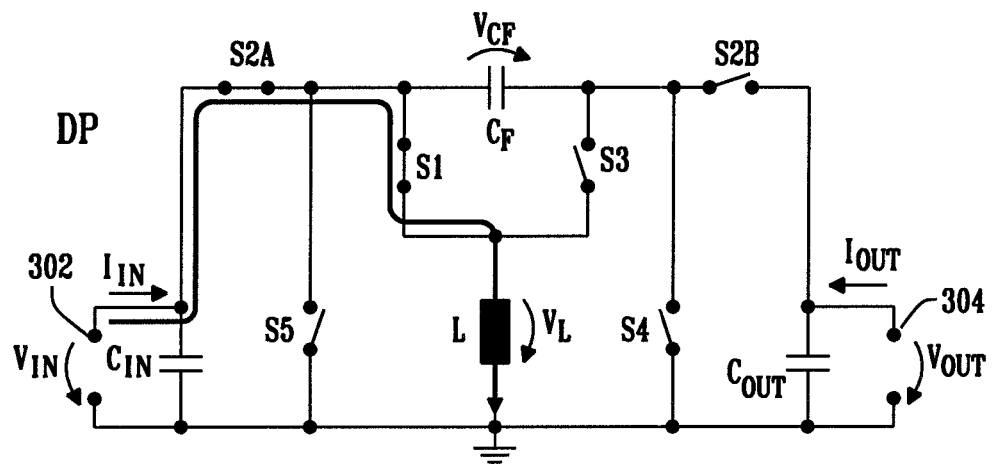
FIG. 4A is a diagram of the power converter of FIG. 3 operating in a first mode magnetization state.

FIG. 4A illustrates the DC-DC converter of FIG. 3 operating in a magnetization state DP, in which the switches S2A, and S1 are closed while the remaining switches S2B, S3, S4 and S5 are open. The input node 302 is coupled to ground via a path that includes the S2A, S1 and the inductor L.

Figure 4B:
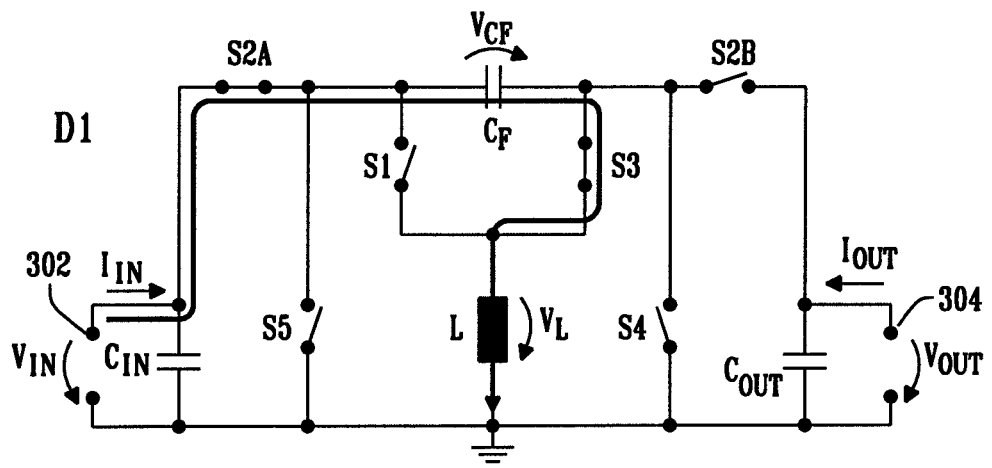
FIG. 4B is a diagram of the power converter of FIG. 3 operating in another first mode state.

FIG. 4B illustrates the DC-DC converter of FIG. 3 operating in another state D1. In this state the switches S2A, and S3 are closed while the remaining switches S1, S2B, S4 and S5 are open. The input node 302 is coupled to ground via a path that includes the S2A, CF, S3 and the inductor L. The state D1 may be a magnetizing state, a de-magnetizing state or a flat state (i.e neither magnetizing nor de-magnetizing) depending on the relation between $V_{IN}$, $V_{OUT}$ and $V_{CF}$. For instance, if $|V_{IN}|>|V_{OUT}|$ then the voltage at node 310 is positive and D1 is a magnetizing state. If $|V_{IN}|<|V_{OUT}|$ the voltage at 310 is negative and D1 is a de-magnetizing state. If $|V_{IN}|=|V_{OUT}|$ the voltage at 310 is null and D1 is neither magnetizing nor de-magnetizing state.

Figure 4C:
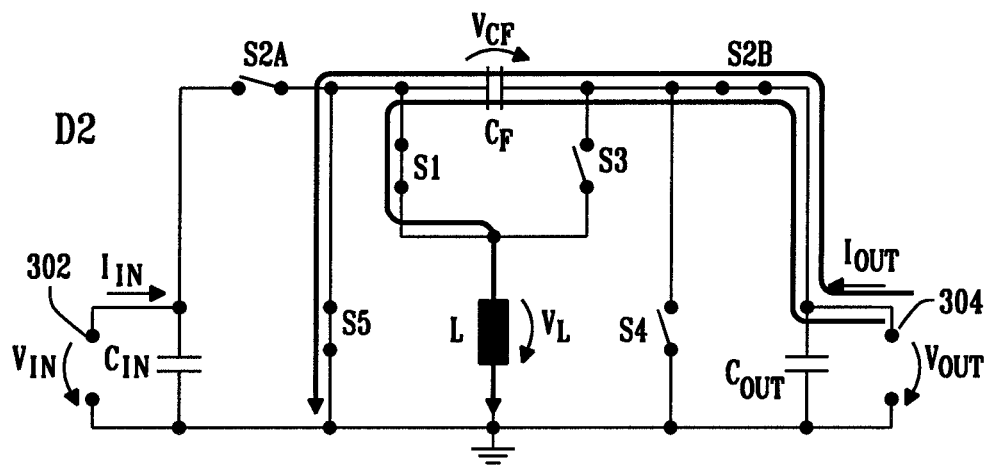
FIG. 4C is a diagram of the power converter of FIG. 3 operating in another a first mode state.

FIG. 4C illustrates the DC-DC converter of FIG. 3 operating in another state D2. In this state the switches S1, S2B, and S5 are closed while the remaining switches S2A, S3 and S4 are open. The output node 304 is coupled to ground via a two paths: a first path that includes the S2B, CF, S5 and a second path that includes S2B, $C_F$, S1 and the inductor L. The state D2 is a flat state that is neither magnetizing nor de-magnetizing. The voltage across the inductor is zero and the current through the inductor remains constant.

Figure 4D:
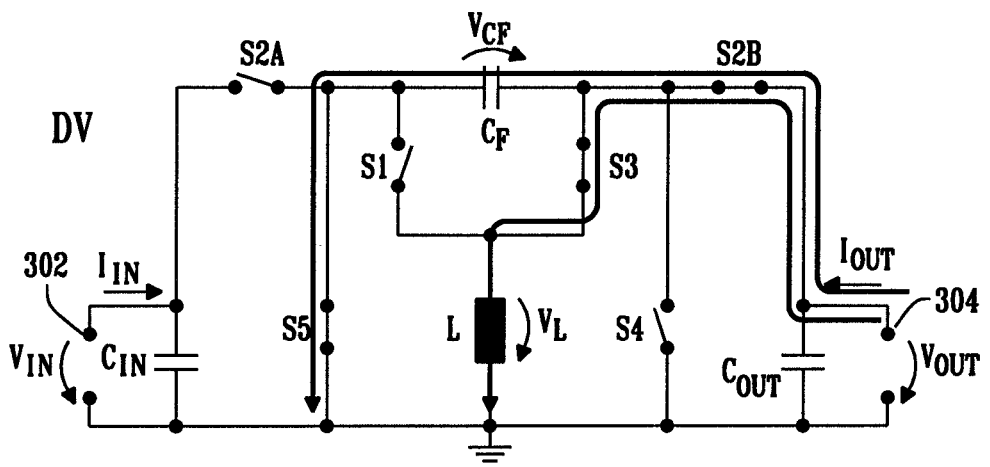
FIG. 4D is a diagram of the power converter of FIG. 3 operating in a first mode de-magnetization state.

FIG. 4D illustrates the DC-DC converter of FIG. 3 operating in a de-magnetization state DV, in which the switches S2B, S3 and S5 are closed while the remaining switches S2A, S1 and S4 are open. The output node 304 is coupled to ground via two paths: a first path that includes the S2B, $C_F$, S5 and a second path that includes S2B, S3 and the inductor L.

The flying capacitance and the switching frequency may be selected so that the voltage $V_{CF}$ remains approximately constant throughout the switching sequence. For instance variations of less than a few hundred mV ripple for maximum output current.

The target voltage conversion ratio $V_{OUT}/V_{IN}$ and the converter topology determine which states should be included in the switching sequence. In the first mode the voltage $V_{CF}=-V_{OUT}$ across the flying capacitor $C_F$. The sequence of switching states may contain one or multiple inductor magnetization states DP according to FIG. 4A.

For voltage conversion ratios $V_{OUT}/V_{IN}<-1$ (That is the output voltage $V_{OUT}$ is larger in magnitude than the input voltage $V_{IN}$: ABS(Vout/Vin)>1) this inductor magnetization may optionally be combined with a D1 switching state according to FIG. 4B.

To fulfil the volt-sec balance principle for the voltage of the inductor L the sequence of switching states must contain one or multiple states D2 according to FIG. 4C.

For small negative output voltages this state D2 may be replaced or combined with a DV state according to FIG. 4D.

By applying the volt-sec balance principle to the voltage of the inductor the below example operation may be implemented (with a voltage $V_{CF}=-V_{OUT}$ across the flying capacitor $C_F$):

$$\frac{V_{OUT}}{V_{IN}} = -\frac{8D}{3+2D} \quad 2D1 = \frac{4}{3}D, \quad D2 = \frac{2}{3}D, \quad DV = 1-2D \quad D \in [0, 0.5] \quad (1)$$

$$\frac{V_{OUT}}{V_{IN}} = -\frac{1+2D}{4-4D} \quad D1 = \frac{4}{3} - \frac{4}{3}D, \quad (2)$$

$$D2 = \frac{2}{3} - \frac{2}{3}D, \quad 2DP = 2D-1 \quad D \in [0.5, 1]$$

The parameter D, also referred to as duty cycle parameter is used to describe and compare the operation of different converter topologies. D restricts the minimum and maximum voltage conversion ratio within a specific operation mode. The sequences are presented so that for (1) 2D1+D2+DV=1, for (2) D1+D2+2DP=1. The equations above define just one possible example operation however other relation would work as well. For instance by changing the D1 with respect to D the ratio $V_{OUT}/V_{IN}$ would also change.

For charge-balance of the flying capacitor $C_F$ the average current through the inductor follows:

$$\frac{I_L}{I_{OUT}} = \frac{3}{3-2D} \quad 2D1 = \frac{4}{3}D, \quad D2 = \frac{2}{3}D, \quad DV = 1-2D \quad D \in [0, 0.5] \quad (3)$$

$$\frac{I_L}{I_{OUT}} = \frac{3}{4-4D} \quad D1 = \frac{4}{3} - \frac{4}{3}D, \quad (4)$$

$$D2 = \frac{2}{3} - \frac{2}{3}D, \quad 2DP = 2D-1 \quad D \in [0.5, 1]$$

The inductor peak-to-peak current ripple $\Delta I_L$ is according to:

$$\Delta I_L = \frac{2V_{IN}}{3Lf_{SW}} D\left(1 - \frac{8D}{3+2D}\right) \quad 2D1 = \frac{4}{3}D, \quad (5)$$

$$D2 = \frac{2}{3}D, \quad DV = 1-2D \quad D \in [0, 0.5]$$

$$\Delta I_L = \frac{V_{IN}}{2Lf_{SW}}(2D-1), \quad D1 = \frac{4}{3} - \frac{4}{3}D, \quad (6)$$

$$D2 = \frac{2}{3} - \frac{2}{3}D, \quad 2DP = 2D-1 \quad D \in [0.5, 1]$$

In equations 5 and 6 $f_{SW}$ is the converter switching frequency.

Figure 5:
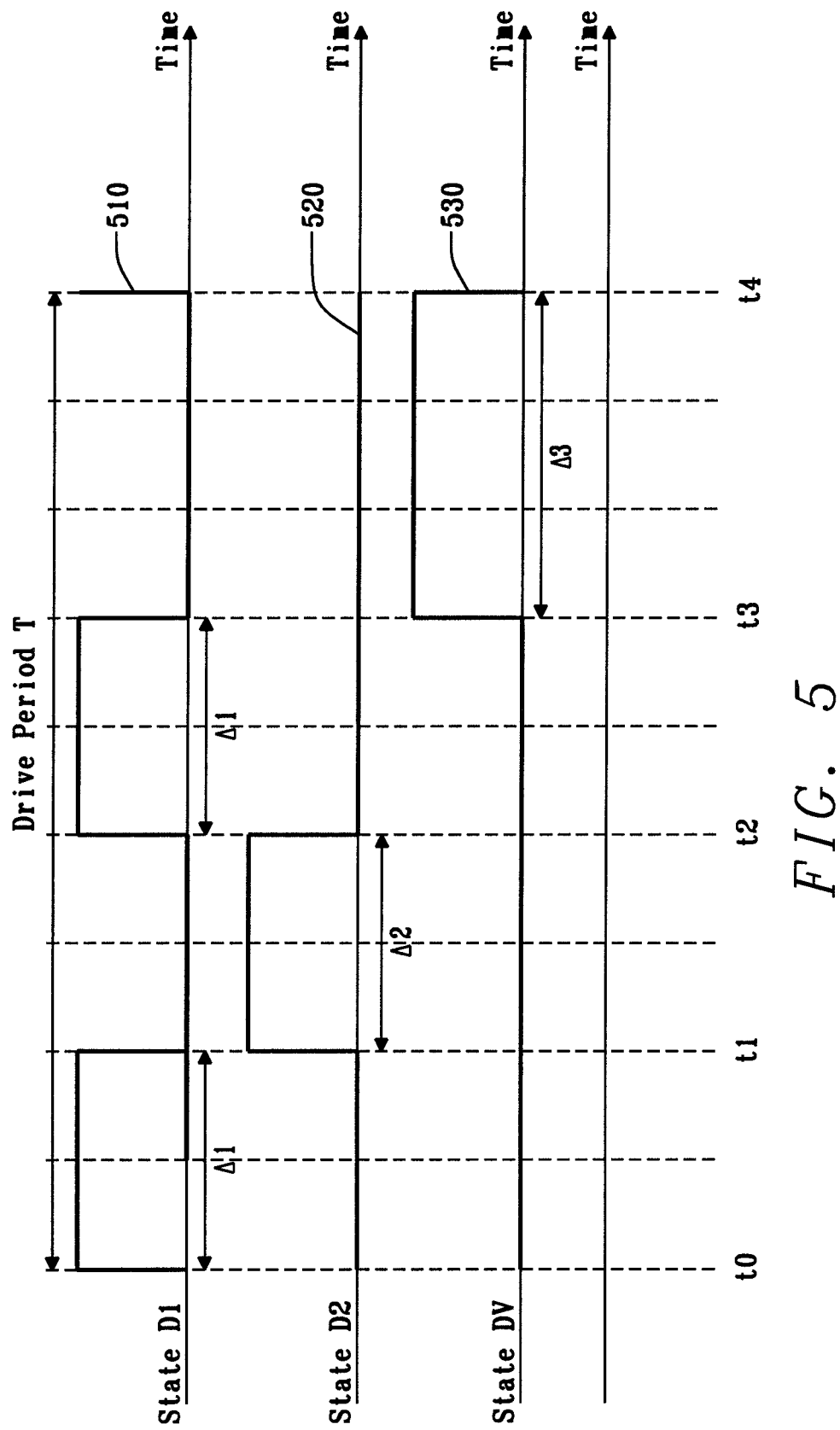
FIG. 5 is a plot of a drive sequence for operating the power converter of FIG. 3 in a first mode with a specific conversion ratio.

FIG. 5 illustrates a drive sequence for operating the DC-DC converter of FIG. 3 with a conversion ratio $$\frac{V_{out}}{V_{in}} = \frac{-8}{11}.$$

The duty cycle D is ⅓ and the driving sequence is defined by equation (1). A possible sequence is D1/D2/D1/DV. In this example, the driver 320 drives the DC-DC converter 300 with the state D1 (waveform 510), between the times t0 and t1 for a duration Δ1=2/9T, then with the state D2 (waveform 520) between the time t1 and t2 for a duration Δ2=Δ1=2/9T, then with the state D1 between t2 and t3, and with the de-magnetization state DV (waveform 530) between the time t3 and t4 for a duration Δ3=3/9T. This sequence is then repeated over time to deliver the required output power. It will be appreciated that alternatively the two occurrences of D1 may be merged, for instance another sequence may be D1/D1/D2/DV.

The average current through the inductor can be obtained using equation (3) as:

$$\frac{I_L}{I_{OUT}} = \frac{9}{7}.$$

FIGS. 6A-6D show four different switching states that may be combined in different ways to operate the converter 300 in a second mode of operation. For instance, the second mode may be a mode of operation used to minimize inductor current ripple.

Figure 6A:
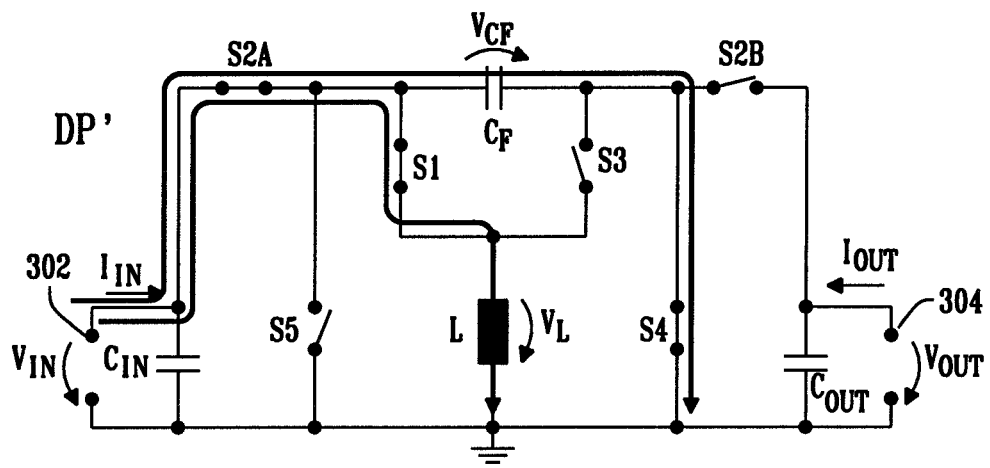
FIG. 6A is a diagram of the power converter of FIG. 3 operating in a second mode magnetization state.

FIG. 6A illustrates the DC-DC converter of FIG. 3 operating in a magnetization state DP', in which the switches S2A, S1 and S4 are closed while the remaining switches S2B, S3 and S5 are open. The input node 302 is coupled to ground via two paths: a first path that includes the S2A, $C_F$, S4 and a second path that includes S2A, S1 and the inductor L.

Figure 6B:
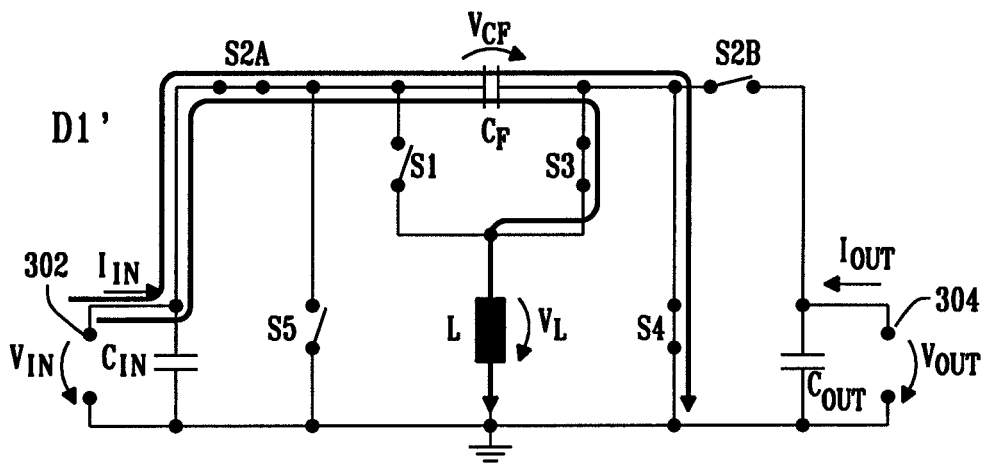
FIG. 6B is a diagram of the power converter of FIG. 3 operating in another second mode state.

FIG. 6B illustrates the DC-DC converter of FIG. 3 operating in another state D1', in which the switches S2A, S3 and S4 are closed while the remaining switches S1, S2B and S5 are open. The input node 302 is coupled to ground via two paths: a first path that includes the S2A, $C_F$, S4 and a second path that includes S2A, $C_F$, S3 and the inductor L. The state D1' is a flat state that is neither magnetizing nor de-magnetizing. The voltage across the inductor is zero and the current through the inductor remains constant.

Figure 6C:
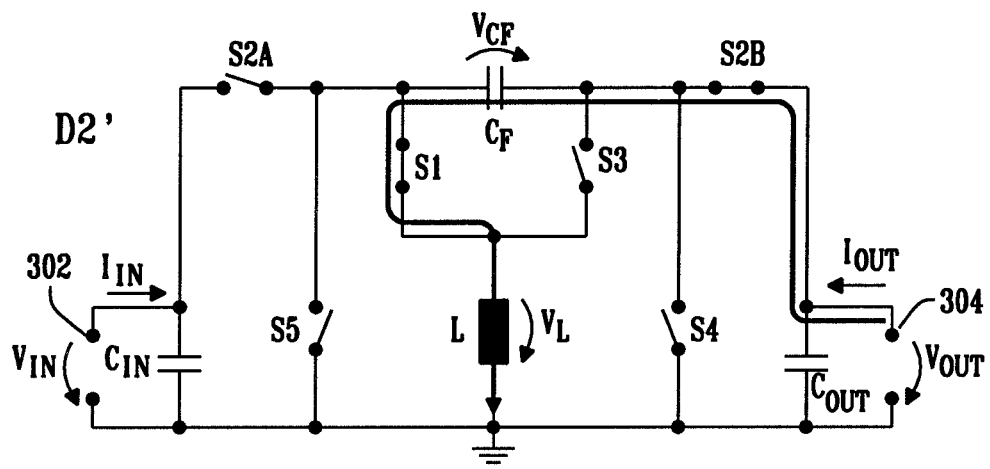
FIG. 6C is a diagram of the power converter of FIG. 3 operating in another second mode state.

FIG. 6C illustrates the DC-DC converter of FIG. 3 operating in another state D2', in which the switches S1 and S2B are closed while the remaining switches S2A, S3, S4 and S5 are open. The output node 304 is coupled to ground via a path that includes S2B, $C_F$, S1 and the inductor L. The state D2' may be a magnetizing state, a de-magnetizing state or a flat state (i.e neither magnetizing nor de-magnetizing) depending on the relation between VIN, VOUT and VCF.

Figure 6D:
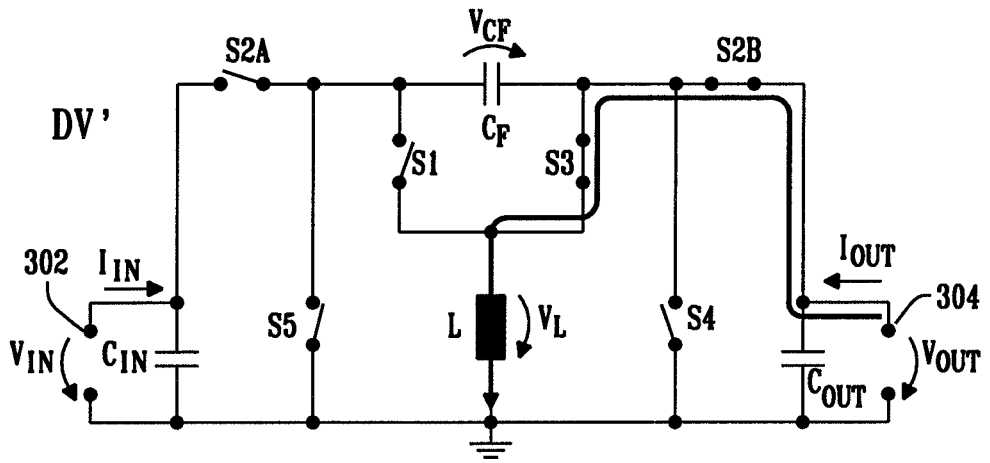
FIG. 6D is a diagram of the power converter of FIG. 3 operating in a second mode de-magnetization state.

FIG. 6D illustrates the DC-DC converter of FIG. 3 operating in a de-magnetization state DV', in which the switches S3 and S2B are closed while the remaining switches S1, S2A, S4 and S5 are open. The output node 304 is coupled to ground via a path that includes S2B, S3 and the inductor L.

The target voltage conversion ratio $V_{OUT}/V_{IN}$ and the converter topology determine which states should be included in the switching sequence. In the second mode the voltage $V_{CF}=V_{IN}$ across the flying capacitor $C_F$. The sequence of switching states may contain one or multiple inductor magnetization states DP' according to FIG. 6A. This inductor magnetization may optionally be combined with a D1' state according to FIG. 6B.

To fulfil the volt-sec balance principle for the voltage of the inductor L the sequence of switching states must contain one or multiple states D2' according to FIG. 6C. For an operation with Vcf=Vout (bypass current through switch S4) and a high absolute conversion ratios ($|V_{OUT}|/|V_{IN}|$), a sequence containing the states DP' (FIG. 6A) and D2'(FIG. 6C) is sufficient to fulfil steady state conditions.

For small negative output voltages (low absolute conversion ratio $|V_{OUT}|/|V_{IN}|$), this state may be replaced or combined with an inductor demagnetization DV' state according to FIG. 6D.

By applying the volt-sec balance principle to the voltage of the inductor the below example operation may be implemented (with a voltage $V_{CF}=V_{IN}$ across the flying capacitor $C_F$):

$$\frac{V_{OUT}}{V_{IN}} = -\frac{6D}{3-2D} \quad D2' = \frac{4}{3}D, \tag{7}$$

$$2DP' = \frac{2}{3}D, \quad DV' = 1-2D \quad D \in [0, 0.5]$$

$$\frac{V_{OUT}}{V_{IN}} = -\frac{3}{4-4D} \quad 2D2' = \frac{4}{3} - \frac{4}{3}D, \quad 2DP' = \frac{4}{3}D - \frac{1}{3} \quad D \in [0.5, 1] \tag{8}$$

For charge-balance of the flying capacitor $C_F$ the average current through the inductor follows:

$$\frac{I_L}{I_{OUT}} = \frac{3}{3-2D} \quad D2' = \frac{4}{3}D, \quad 2DP' = \frac{2}{3}D, \quad DV' = 1-2D \quad D \in [0, 0.5] \tag{9}$$

$$\frac{I_L}{I_{OUT}} = \frac{3}{4-4D} \quad 2D2' = \frac{4}{3} - \frac{4}{3}D, \quad 2DP' = \frac{4}{3}D - \frac{1}{3} \quad D \in [0.5, 1] \tag{10}$$

The inductor peak-to-peak current ripple $\Delta I_L$ is according to:

$$\Delta I_L = \frac{V_{IN}}{3Lf_{SW}}D \quad D2' = \frac{4}{3}D, \quad 2DP' = \frac{2}{3}D, \quad DV' = 1-2D \quad D \in [0, 0.5] \tag{11}$$

$$\Delta I_L = \frac{V_{IN}}{6Lf_{SW}}(4D-1) \quad 2D2' = \frac{4}{3} - \frac{4}{3}D, \quad 2DP' = \frac{4}{3}D - \frac{1}{3} \quad D \in [0.5, 1] \tag{12}$$

Figure 7:
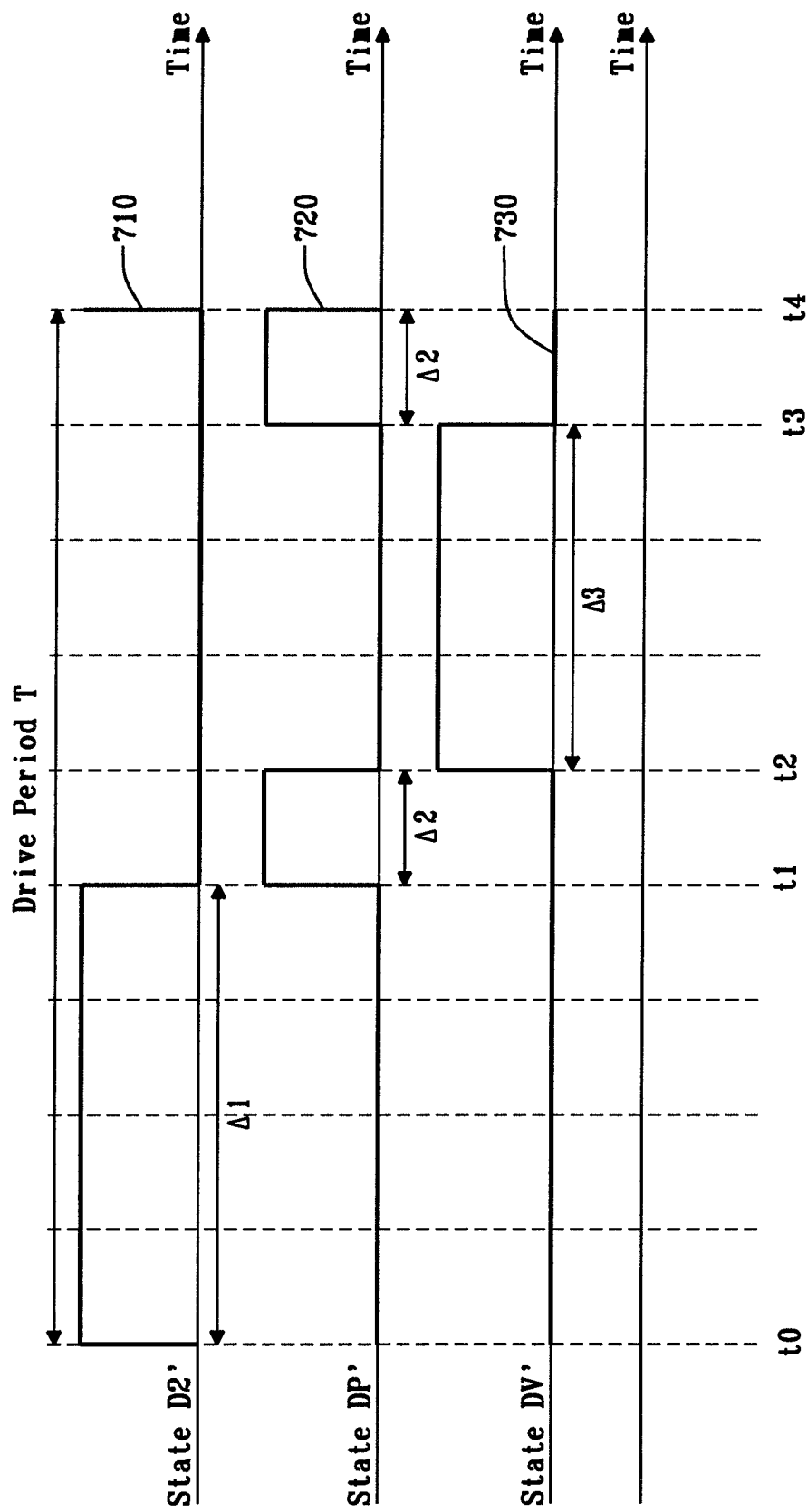
FIG. 7 is a plot of a drive sequence for operating the power converter of FIG. 3 in a second mode with a specific conversion ratio.

FIG. 7 illustrates a drive sequence for operating the DC-DC converter of FIG. 3 with a conversion ratio $$\frac{V_{out}}{V_{in}} = \frac{-6}{7}.$$

The duty cycle D is ⅓ and the driving sequence is defined by equation (7). A possible sequence is D2'/DP'/DV'/DP'. In this example, the driver 320 drives the DC-DC converter 300 with the state D2' (waveform 710), between the times t0 and t1 for a duration Δ1=4/9T, then with the magnetization state DP' (waveform 720) between the time t1 and t2 for a duration Δ2=1/9T, then with the de-magnetization state DV' (waveform 730) between the time t2 and t3 for a duration Δ3=3/9T, and with the state DP' between the time t3 and t4 for a duration Δ2. This sequence is then repeated over time to deliver the required output power. It will be appreciated that alternatively the two occurrences of DP' may be merged, for instance another sequence may be D2'/DP'/DP'/DV'.

A numerical example can be provided Vin=1V, L=1 μH and a converter switching frequency of $f_{SW}$=1 MHz. In this scenario the inductor peak-to-peak current ripple $\Delta I_L$ can be obtained using equation (11) as:

$$\Delta I_L = \frac{1}{9}$$

Amperes.

Figures 8, 9:
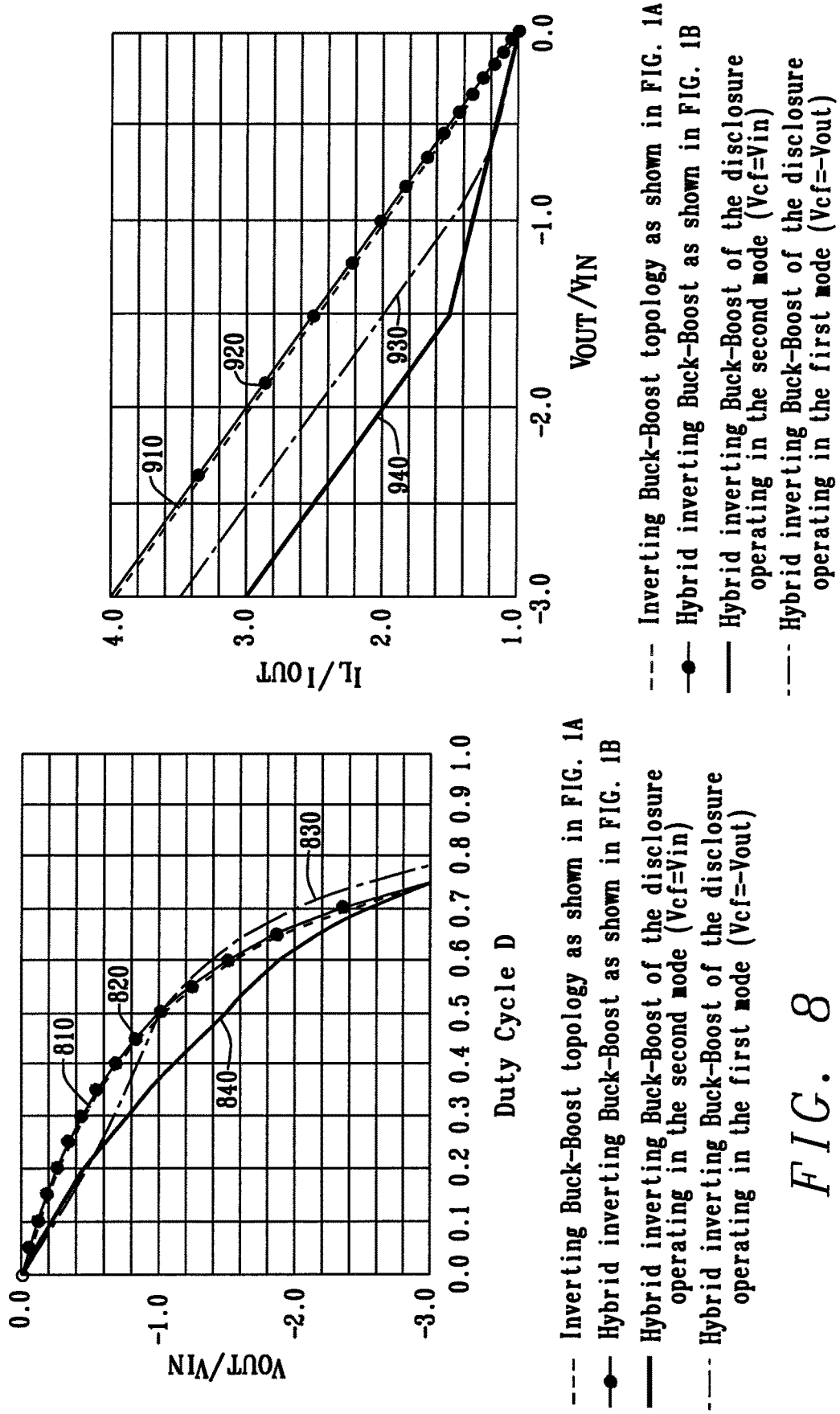
FIG. 8 is a plot of the the voltage conversion ratio $V_{OUT}/V_{IN}$ as a function of the duty cycle of the switching states obtained for different inverting buck-boost topologies.
FIG. 9 is a plot of the ratio $I_L/I_{OUT}$ as a function of the voltage conversion ratio $V_{OUT}/V_{IN}$ obtained for different inverting buck-boost topologies.

FIG. 8 shows the relation between the duty cycle of the switching states D and the voltage conversion ratio $V_{OUT}/V_{IN}$ for an inverting buck-boost topology as shown in FIG. 1A (810), a hybrid inverting buck-boost converter as shown in FIG. 1B (820), the hybrid inverting buck-boost of the disclosure operating in the first mode (830), the hybrid inverting buck-boost of the disclosure operating in the second mode (840).

FIG. 9 shows the ratio $I_L/I_{OUT}$ as a function of the voltage conversion ratio $V_{OUT}/V_{IN}$ for an inverting buck-boost topology as shown in FIG. 1A (910), a hybrid inverting buck-boost converter as shown in FIG. 1B (920), the hybrid inverting buck-boost of the disclosure operating in the first mode (930), and the hybrid inverting buck-boost of the disclosure operating in the second mode (940). The buck-boost converter of the disclosure reduces the average current through the inductor in comparison to both prior art topologies.

Figure 10:
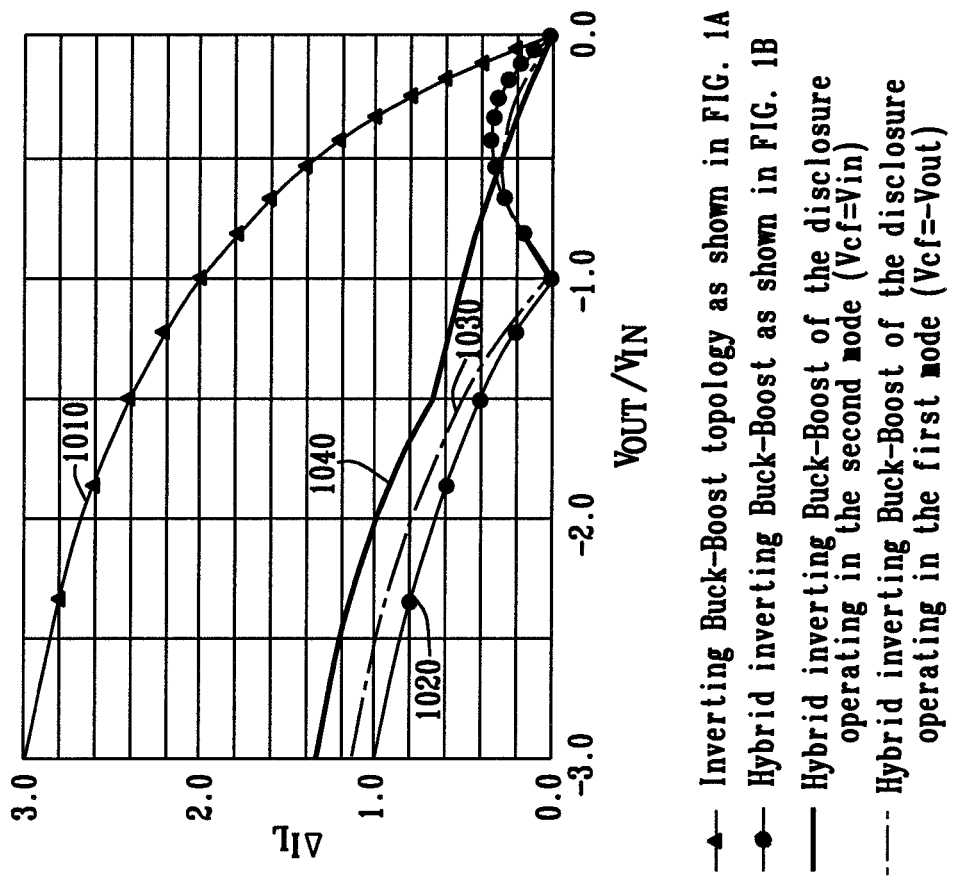
FIG. 10 is a plot of the inductor peak-to-peak current ripple as a function of the voltage conversion ratio $V_{OUT}/V_{IN}$ obtained for different inverting buck-boost topologies.

FIG. 10 shows the inductor peak-to-peak current ripple as a function of the voltage conversion ratio $V_{OUT}/V_{IN}$ for an inverting buck-boost topology as shown in FIG. 1A (1010), a hybrid inverting buck-boost converter as shown in FIG. 1B (1020), the hybrid inverting buck-boost of the disclosure operating in the first mode (1030), and the hybrid inverting buck-boost of the disclosure operating in the second mode (1040).

The inductor current ripple is shown for an example input voltage of $V_{IN}$=4V, an example inductor of L=1 μH and a converter switching frequency of $f_{SW}$=1 MHz.

The converter circuit of FIG. 3 improves inductor current ripple in comparison to the inductive buck-boost converter of FIG. 1A. A switching sequence with $V_{CF}=-V_{OUT}$ (first mode) achieves inductor current ripple similar to the prior art of FIG. 1B. The switching sequence with $V_{CF}=V_{IN}$ (second mode) typically implements a slightly higher inductor current ripple but enables the largest reduction of average inductor current.

For a voltage conversion ratio of $V_{OUT}/V_{IN}=-1$ the two conditions $V_{CF}=-V_{OUT}$ and $V_{CF}=V_{IN}$ are met and the converter of FIG. 3 can change between the first mode and the second mode seamlessly. For other conversion ratios the voltage across the flying capacitor is different ($|V_{out}|<>|V_{in}|$). As a result a transition phase must be introduced to change between the first mode and the second mode. The transition phase is used to change the flying capacitor voltage before hardly connecting the flying capacitor in parallel to the opposite port (toggling from Vin to Vout or vice-versa).

Therefore, the converter of FIG. 3 may be controlled to dynamically change the voltage $V_{CF}$ across the flying capacitor $C_F$ whenever the voltage conversion ratio reaches $V_{OUT}/V_{IN}=-1$ and by that support both the first and the second modes of operation. This enables dynamic optimization of the converter performance for either minimum inductor current ripple or lowest average inductor current.

It will be appreciated that the topology of the circuit of FIG. 3 may be simplified depending on the mode of operation utilized.

Figure 11A:
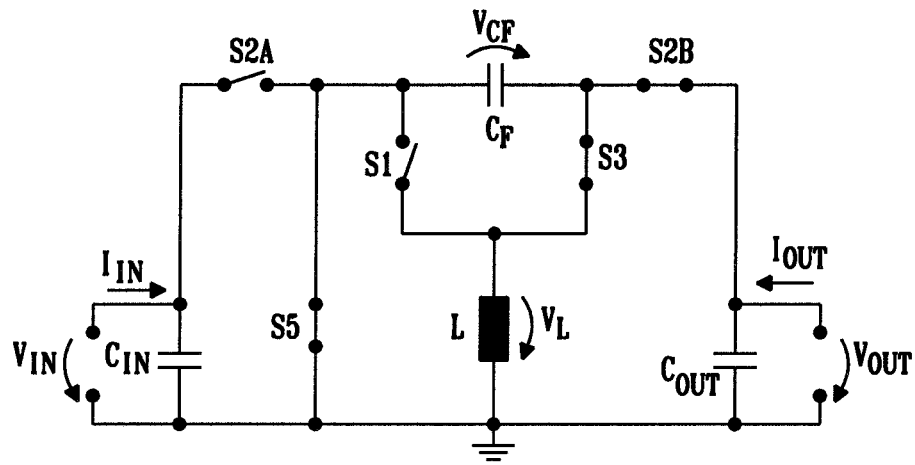
FIG. 11A is a simplified topology of the circuit of FIG. 3 suitable for the first mode operation.

FIG. 11A illustrates a simplified topology for operating the circuit of FIG. 3 only in the first mode as described with respect to FIGS. 4A-4D in which the switch S4 is not required.

Figure 11B:
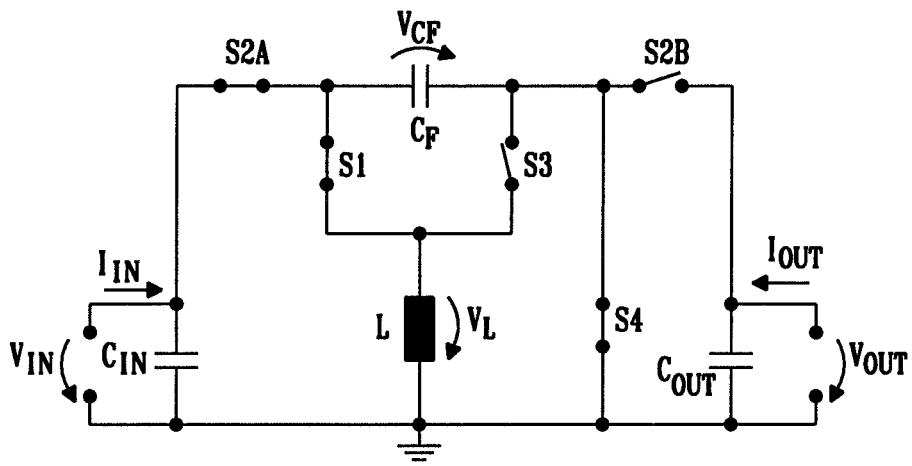
FIG. 11B is a simplified topology of the circuit of FIG. 3 suitable for the second mode operation.

FIG. 11B illustrates a simplified topology for operating the circuit of FIG. 3 only in the second mode as described with respect to FIGS. 6A-6D in which the switch S5 is not required.

Figure 12:
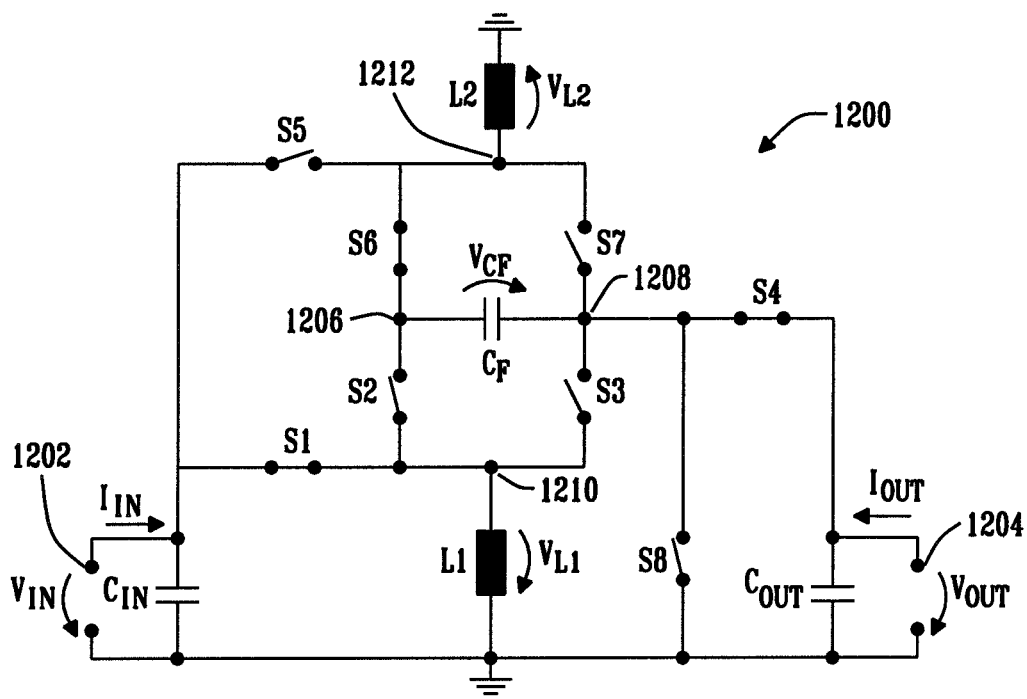
FIG. 12 is a diagram of a multi-phase derivative of the power converter of FIG. 3.

FIG. 12 shows a multi-phase derivative of the power converter of FIG. 3. Such a multiphase converter may be used in application that require high load currents that cannot be handled with a single inductor.

The DC-DC converter 1200 includes a first inductor L1, a second inductor L2, and a flying capacitor CF coupled between a first port (input port 1202) and a second port (output port 1204) by a network of switches formed of eight switches S1, S2, S3, S4, S5, S6, S7, S8. An input capacitor Cin is provided between the input node 1202 and ground and an output capacitor Cout is provided between the output node 1204 and ground.

The flying capacitor CF has a first terminal (node 1206) coupled to the first inductor L1 via the capacitor switch S2 and to the second inductor L2 via the capacitor switch S6, and a second terminal (node 1208) coupled to L1 via the capacitor switch S3 and to L2 via capacitor switch S7. The first inductor L1 has a first terminal coupled to CF at node 1210 and to the input node via input switch S1, and a second terminal coupled to ground. The second inductor L2 has a first terminal coupled to CF at node 1212 and to the input node via input switch S5, and a second terminal coupled to ground. The flying capacitor second terminal (node 1208) is coupled to the output port 1204 via the output switch S4 and to ground via the second ground switch S8.

A driver (not shown) is provided to generate a plurality of control signals Ct1-Ct8 to operate the switches S1-S8 respectively. The driver is adapted to operate the DC-DC converter 1200 with a sequence of states during a drive period T. The sequence of state may include one or more magnetization states to magnetize the inductor L and one or more de-magnetization states to de-magnetize the inductor L. The driver may be configured to maintain the magnetization state(s) and the de-magnetization state(s) for a predetermined duration during the drive period. For instance, a duty cycle of the magnetization state(s) and a duty cycle of the de-magnetization state(s) may be selected to achieve a target conversion ratio.

Figure 13A:
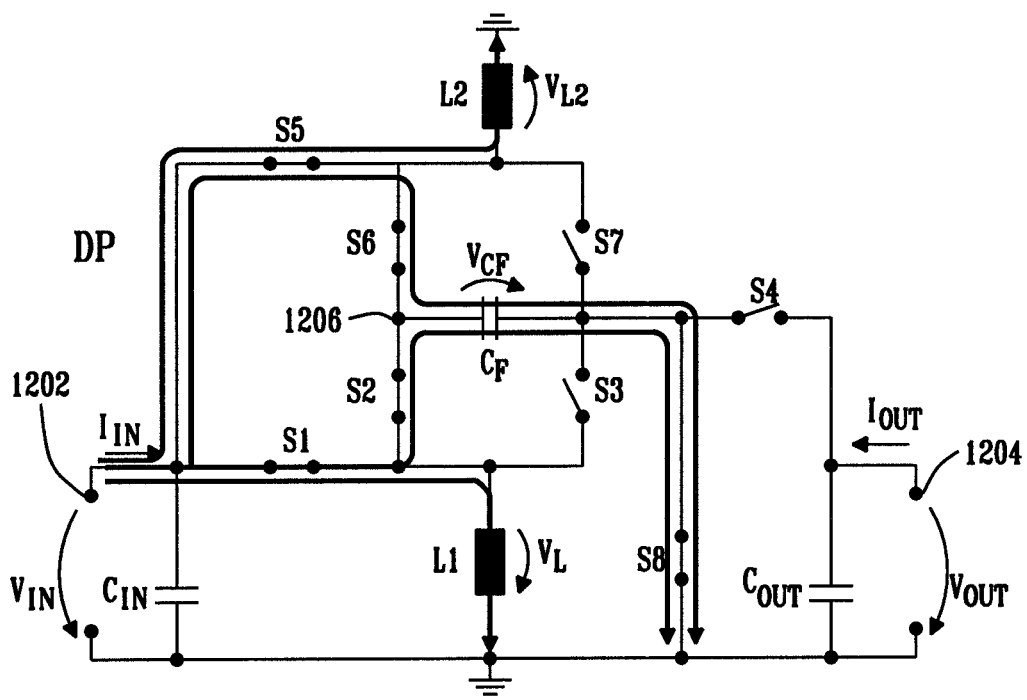
FIG. 13A is a diagram of the power converter of FIG. 12 operating in a first state.

FIG. 13A illustrates the DC-DC converter of FIG. 12 operating in a magnetization state DP, in which the switches S1, S2, S5, S6, S8 are closed while the remaining switches S3, S4 and S7 are open. The input node 1202 is coupled to ground via four paths: a first path that includes S1 and the first inductor L1; a second path that includes S1, S2, CF and S8; a third path that includes S5, S6, CF, and S8; a fourth path that includes S5 and the second inductor L2.

Figure 13B:
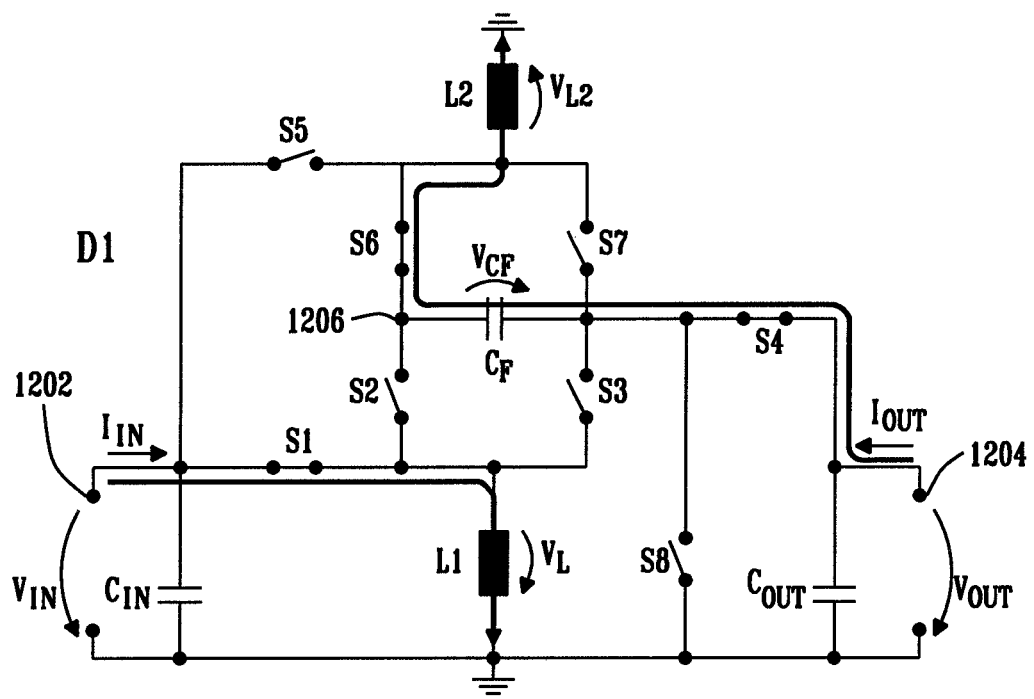
FIG. 13B is a diagram of the power converter of FIG. 12 operating in second state.

FIG. 13B illustrates the DC-DC converter of FIG. 3 operating in state D1, in which the switches S1, S4, and S6 are closed while the remaining switches S2, S3, S5, S7 and S8 are open. The input node 1202 is coupled to ground via a path that includes S1 and the first inductor L1. The output node 1204 is coupled to ground via a path that includes S4, $C_F$, S6, and the second inductor L2.

Figure 13C:
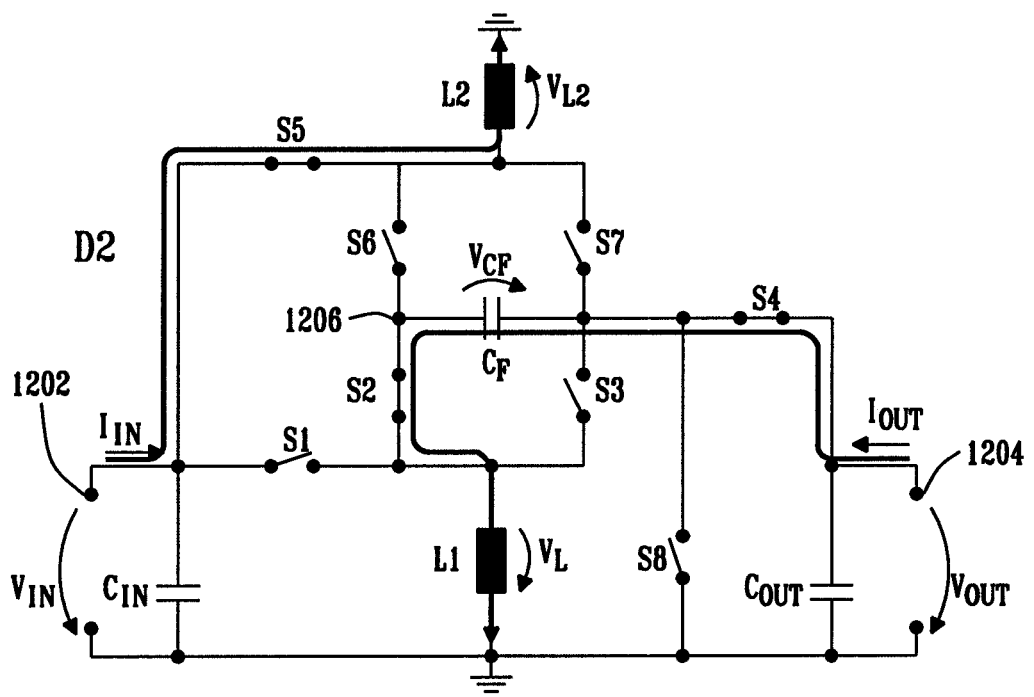
FIG. 13C is a diagram of the power converter of FIG. 12 operating in a third state.

FIG. 13C illustrates the DC-DC converter of FIG. 3 operating in state D2, in which the switches S2, S4, and S5 are closed while the remaining switches S1, S3, S6, S7 and S8 are open. The input node 1202 is coupled to ground via a path that includes S5 and the second inductor L2. The output node 1204 is coupled to ground via a path that includes S4, $C_F$, S2, and the first inductor L1.

Figure 13D:
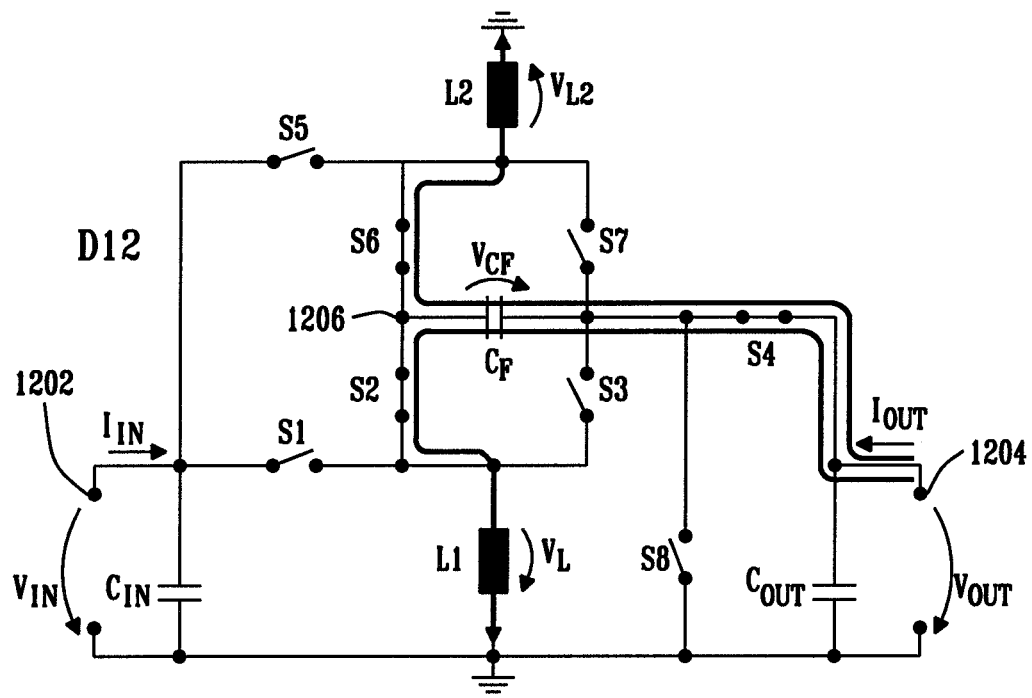
FIG. 13D is a diagram of the power converter of FIG. 12 operating in a fourth state.

FIG. 13D illustrates the DC-DC converter of FIG. 3 operating in state D12, in which the switches S2, S4, and S6 are closed while the remaining switches S1, S3, S5, S7 and S8 are open. The output node 1204 is coupled to ground via two paths: a first path that includes S4, $C_F$, S2, L1; and a second path that includes S4, $C_F$, S6, L2.

Figure 13E:
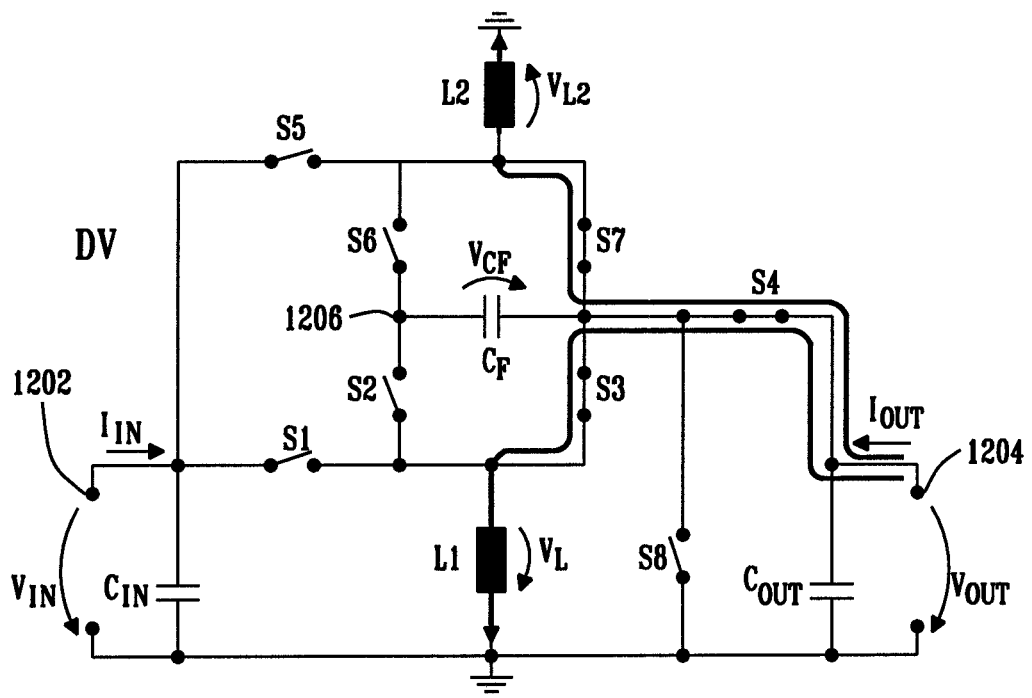
FIG. 13E is a diagram of the power converter of FIG. 12 operating in a fifth state.

FIG. 13E illustrates the DC-DC converter of FIG. 3 operating in state DV, in which the switches S3, S4, and S7 are closed while the remaining switches S1, S2, S5, S6 and S8 are open. The output node 1204 is coupled to ground via two paths: a first path that includes S4, S3, L1; and a second path that includes S4, S7, L2. During the state DV both L1 and L2 are de-magnetized.

With a voltage $V_{CF}=V_{IN}$ across the flying capacitor $C_F$ the sequence of switching states may contain one or multiple magnetization states DP according to FIG. 13A.

To fulfil the volt-sec balance principle for the voltage of the inductor L2 the sequence of switching states may contain one or multiple states D1 according to FIG. 13B.

To fulfil the volt-sec balance principle for the voltage of the inductor L1 the sequence of switching states may contain one or multiple states D2 according to FIG. 13C.

The states D1 and D2 may be combined with the state D12 according to FIG. 13D. The states D1, D2 or D12 may also be replaced or combined with the inductor de-magnetization DV state according to FIG. 13E.

Furthermore, current paths from the state DV may be combined with current paths from switching states D1, D2 or D12 to create additional optional switching states. The current path through inductor L1 in state DV may replace the current path through inductor L1 in the states D1, D2, D12 hence creating new states D1', D2' and/or D12' (not shown). In this case symmetrical states D1", D2" and/or D12" would be required with the current path through inductor L2 being replaced with the corresponding current path from state DV.

Hybrid inverting buck-boost architectures as described in U.S. Pat. No. 10,476,390 outperform traditional pure inductive converters by reducing inductor current ripple and enabling lower inductance and/or reduced switching frequency. This reduces solution footprint, height, and conversion loss. Lower inductance also accelerates the ramping of inductor current, improving the converter response to transient line and load and from that reduces output voltage ripple.

In addition to these advantages the converter topologies of the disclosure reduce the average inductor current, reduce inductor conduction loss and reduce inductor saturation current. Depending on the requirements of the application this may even unlock the removal of a complete converter phase. By reducing the average inductor current (for the same output current) inductors are reaching their saturation current limit at a higher output current. Consequently in some cases a phase may be no longer be needed, hence reducing BOM area and cost.

The power converter of the disclosure may be used in a variety of applications. For instance, the power converter may be used to power a display of a user device such as a tablet or a mobile phone.

Figure 14:
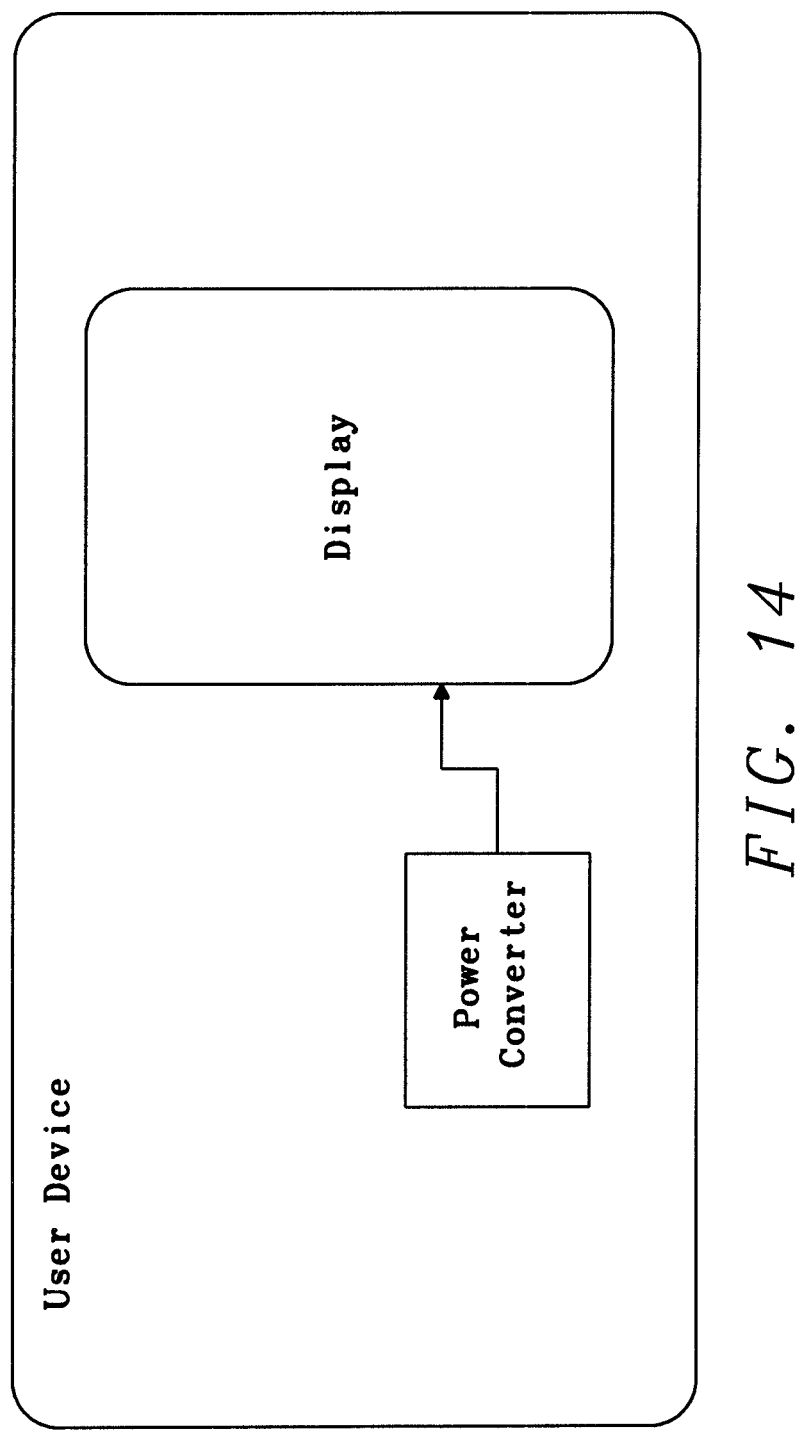
FIG. 14 is a diagram of a user device provided with a display and a power converter according to the disclosure.

FIG. 14 is a diagram of a user device provided with a display and a power converter according to the disclosure.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

What is claimed is:

1. A power converter having a ground port, an input port for receiving an input voltage and an output port for providing an output voltage with a target conversion ratio, the power converter comprising an inductor; a flying capacitor selectively coupled to the inductor; a network of switches; and a driver adapted to drive the network of switches with a sequence of states during a drive period, the sequence of states comprising a first state and a second state, wherein in the first state one of the input port and the output port is coupled to the ground port via a first path comprising the inductor; wherein in the second state the remaining ports among the input port and the output port is coupled to the ground port via a second path and a third path, the second path comprising the flying capacitor and bypassing the inductor, and the third path comprising the inductor.

2. The power converter as claimed in claim 1, wherein the network of switches comprises
a first capacitor switch to couple a first terminal of the flying capacitor to the inductor;
a second capacitor switch to couple a second terminal of the flying capacitor to the inductor; and
a first ground switch to couple the flying capacitor to the ground port.

3. The power converter as claimed in claim 2, wherein the network of switches comprises a second ground switch to couple the flying capacitor to the ground port.

4. The power converter as claimed in claim 3, wherein the network of switches comprises
an input switch to couple the first terminal of the flying capacitor to the input port; and
an output switch to couple the second terminal of the flying capacitor to the output port.

5. The power converter as claimed in claim 2, comprising a second inductor.

6. The power converter as claimed in claim 5, wherein the network of switches comprises
a third capacitor switch to couple a first terminal of the flying capacitor to the second inductor; and
a fourth capacitor switch to couple a second terminal of the flying capacitor to the second inductor.

7. The power converter as claimed in claim 6, wherein the network of switches comprises
a first input switch to couple the first inductor to the input port; and
a second input switch to couple the second inductor to the input port.

8. The power converter as claimed in claim 7, wherein the network of switches comprises
an output switch to couple the flying capacitor to the output port.

9. The power converter as claimed in claim 5, wherein in the first state one of the input port and the output port is coupled to the ground port via another path comprising the second inductor; and
wherein in the second state the input port is coupled to the ground port via four paths that include the second path, the third path, a fourth path comprising the flying capacitor and bypassing the inductor, and a fifth path comprising the second inductor.

10. The power converter as claimed in claim 1, wherein in the first state the first path comprises both the inductor and the flying capacitor.

11. The power converter as claimed in claim 1, wherein in the second state the third path comprises both the inductor and the flying capacitor.

12. The power converter as claimed in claim 1, wherein one of the first state and the second state is a magnetizing state and the other state is a de-magnetizing state.

13. The power converter as claimed in claim 1, wherein the driver is operable in at least one of a first mode and a second mode.

14. The power converter as claimed in claim 13, wherein in the first mode a voltage across the flying capacitor is substantially equal to minus the output voltage during the drive period and in the second mode the voltage across the flying capacitor is substantially equal to the input voltage during the drive period.

15. The power converter as claimed in claim 1, wherein the power converter is an inverting power converter to provide the output voltage with an opposite polarity compared with the input voltage.

16. The power converter as claimed in claim 15, wherein the power converter is operable as an inverting step-down converter or as an inverting step-up converter.

17. A method of converting power with a target conversion ratio, the method comprising providing a power converter having a ground port, an input port for receiving an input voltage and an output port for providing an output voltage; an inductor; a flying capacitor selectively coupled to the inductor; a network of switches; and driving the network of switches with a sequence of states during a drive period, the sequence of states comprising a first state and a second state, wherein in the first state one of the input port and the output port is coupled to the ground port via a first path comprising the inductor; wherein in the second state the remaining ports among the input port and the output port is coupled to the ground port via a second path and a third path, the second path comprising the flying capacitor and bypassing the inductor, and the third path comprising the inductor.

18. A user device comprising a display and a power converter for powering the display, the power converter having a ground port, an input port for receiving an input voltage and an output port for providing an output voltage with a target conversion ratio, the power converter comprising an inductor; a flying capacitor selectively coupled to the inductor; a network of switches; and a driver adapted to drive the network of switches with a sequence of states during a drive period, the sequence of states comprising a first state and a second state, wherein in the first state one of the input port and the output port is coupled to the ground port via a first path comprising the inductor; wherein in the second state the remaining ports among the input port and the output port is coupled to the ground port via a second path and a third path, the second path comprising the flying capacitor and bypassing the inductor, and the third path comprising the inductor.

* * * * *